Figure 1:
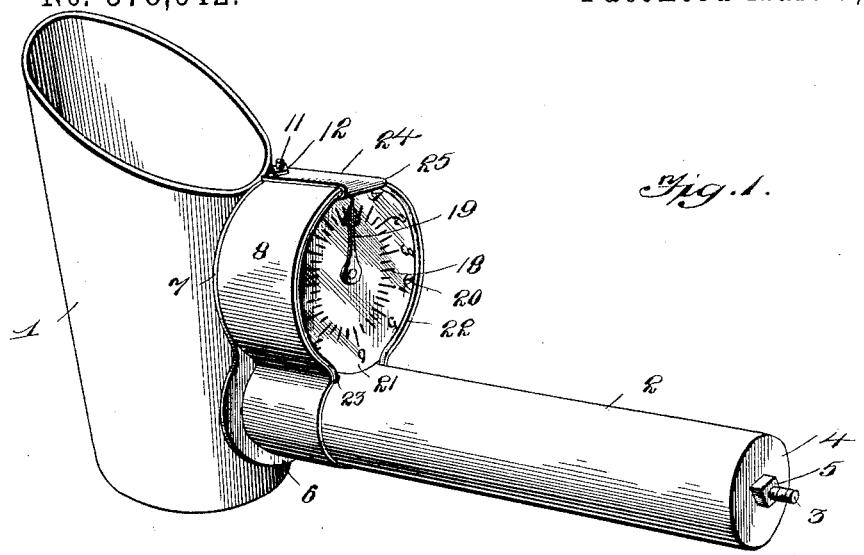

(No Model.)

D. R. JOSLYN.
WEIGHING SCOOP.

No. 578,642. Patented Mar. 9, 1897.

Witnesses
W. J. Koerth.
R. M. Smith.

Inventor
Daniel R. Joslyn,
By his Attorneys,
C. A. Snow & Co.

UNITED STATES PATENT OFFICE.

DANIEL R. JOSLYN, OF GURDON, ARKANSAS.

WEIGHING-SCOOP.

SPECIFICATION forming part of Letters Patent No. 578,642, dated March 9, 1897.

Application filed April 15, 1896. Serial No. 587,673. (No model.)

*To all whom it may concern:*

Be it known that I, DANIEL R. JOSLYN, a citizen of the United States, residing at Gurdon, in the county of Clark and State of Arkansas, have invented a new and useful Weighing-Scoop, of which the following is a specification.

This invention relates to weighing-scoops; and the object in view is to provide, in connection with a scoop or measuring vessel and the handle thereof, a weighing apparatus so related to and connected with the scoop as to be influenced by the latter, thereby causing the said weighing apparatus, by means of a hand and dial, to visually indicate the exact weight of the contents of the scoop or vessel.

The invention also has for its object to arrange the weighing apparatus in such relation to the scoop that the material as it is dipped up by the scoop cannot accumulate over the dial and obstruct the vision, also to provide means for adjusting the tension of the weighing-spring.

Other objects and advantages of the invention will appear in the course of the subjoined description.

The invention consists in an improved weighing-scoop embodying certain novel features and details of construction and arrangement of parts, as hereinafter fully described, illustrated in the drawings, and claimed.

Figure 4:
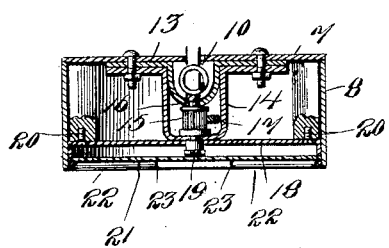
Figure 3:
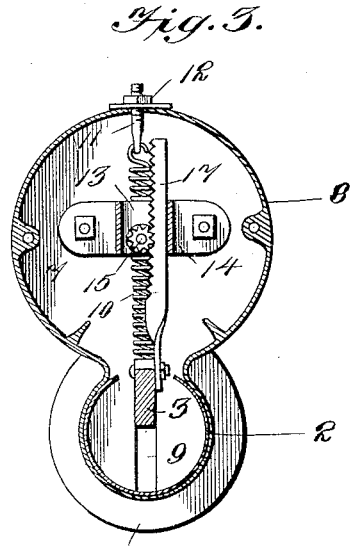
Figure 2:
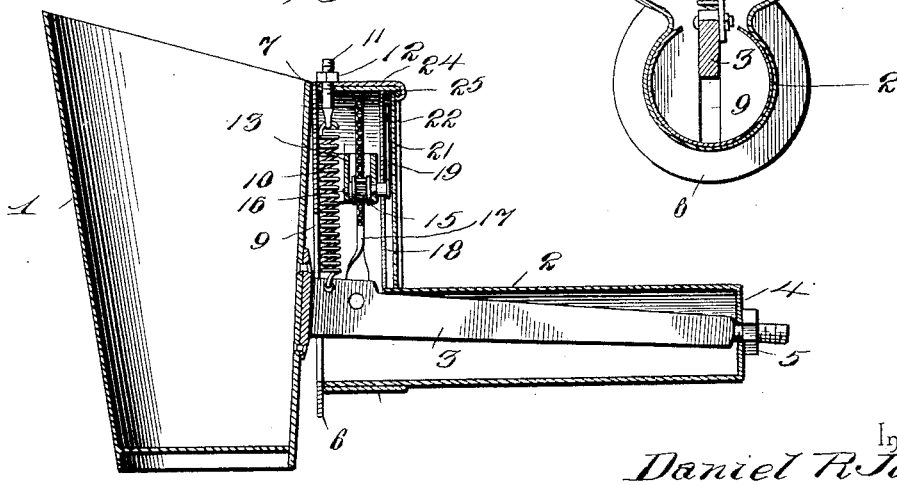

In the accompanying drawings, Figure 1 is a perspective view of a weighing-scoop constructed in accordance with the present invention. Fig. 2 is a vertical longitudinal section through the same. Fig. 3 is a vertical transverse section through the case of the weighing apparatus. Fig. 4 is a detail horizontal section through the same.

Similar numerals of reference designate corresponding parts in the several figures of the drawings.

Referring to the accompanying drawings, 1 designates a scoop, and 2 the hollow handle thereof. The handle 2 is preferably of cylindrical form, and the scoop 1 is mounted rigidly upon the outer end of a beam 3, which extends through the handle and passes through an opening in the inner closed end 4 of the handle, where it is held by means of the nut 5. The opposite end of the handle is closed by a plate 6, and this plate is extended above the plane of the handle to form the disk-shaped wall 7 of the case in which the weighing apparatus is located.

8 designates an annular flange or casing-plate which extends around the edge of the plate 7 and joins onto the handle 2. A slot 9 extends vertically in the plate 6 and also upward into the plate or wall 7 of the weighing-case, and the beam 3 works up and down in this slot as it is influenced by the weight of the material in the scoop. A spiral spring 10 connects at its lower end with the beam 3 and at its upper end with an eyebolt 11, said eyebolt passing through the top wall of the case of the weighing apparatus and being engaged by a nut 12, with the aid of which the eyebolt may be adjusted and the tension of the weighing-spring correspondingly regulated.

13 indicates a bracket which is secured to the inner surface of the rear wall or plate 7 of the weighing-case, said bracket having a U-shaped central bend, whereby it embraces the spring 10 and forms a housing therefor. Another bracket 14, of similar form, is arranged in the same horizontal plane with the bracket 13 and secured to the wall or plate 7 by the same fastening means. Sufficient space is, however, left between the U-shaped portions of the brackets 13 and 14 to allow of the interposition of a pinion 15, mounted upon a short horizontal spindle 16, journaled in bearing-openings in the said brackets. A rack-bar 17 meshes with said pinion and is pivotally connected at its lower end to the vibrating beam 3. Thus as the beam 3 is depressed by the weight of material in the scoop the rack-bar is caused to rotate the pinion and its spindle.

A graduated dial 18 closes the weighing-case upon that side next to the handle 2, and the spindle of the pinion (above described) is extended through an opening in the center of the dial and has applied thereto an indicator-hand 19, which by the rotary movement of the spindle is caused to revolve upon the dial and indicate, in connection with the graduated scale thereon, the weight of the material contained in the scoop. The dial is held in place by means of suitable fastenings 20 and is covered by a circular glass 21, which is conveniently held in place by means of a spring-wire loop 22, the terminals of which are deflected radially and inserted in openings 23 in the upper side of the handle, the upper portion of said loop being prevented from displacement by means of a clip 24, secured at the top of the weighing-case over the eyebolt 11, and having a lip 25, which overhangs the loop 22.

From the foregoing description, taken in connection with the drawings, it will be seen that the face of the dial faces away from the scoop and that it is vertically disposed, thus rendering it impossible for such dial to become obstructed by the accumulation of the material being weighed; also, that the weighing-spring may be adjusted and corrected with ease whenever necessary. The hollow handle affords a very convenient housing for the scale-beam and admits of the employment of a comparatively long beam.

The improved weighing-scoop may be made in various sizes to suit the trade, and various changes in the form, proportion, and minor details of construction may be resorted to without departing from the spirit or sacrificing any of the advantages of the invention.

Having thus described the invention, what is claimed as new is—

The combination with a scoop having a rigid beam projecting rearwardly therefrom, of a hollow tubular handle through which said beam extends longitudinally and upon the rear closed end of which it is pivotally mounted, a case supported by the front end of the handle and interiorly in communication therewith, the rear side of said case having a dial traversed by a pointer and covered by a transparent protecting medium, yielding devices for normally holding the scoop in its elevated position, and connections between the beam and said pointer whereby the depression of the latter is indicated upon the dial, substantially as specified.

In testimony that I claim the foregoing as my own I have hereto affixed my signature in the presence of two witnesses.

DANIEL R. JOSLYN.

Witnesses:
E. W. WHITMER,
A. B. BURDRE.